(12) United States Patent
Ryu et al.

(10) Patent No.: US 6,808,402 B2
(45) Date of Patent: Oct. 26, 2004

(54) PORTABLE WIRELESS TERMINAL WITH A GROUND CONNECTING DEVICE USING A HINGE MODULE AND METHOD FOR USING THE SAME

(75) Inventors: Gwan-Woo Ryu, Kumi-shi (KR); Sung-Ha Jung, Kumi-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 114 days.

(21) Appl. No.: 10/347,606

(22) Filed: Jan. 22, 2003

(65) Prior Publication Data

US 2004/0014343 A1 Jan. 22, 2004

(30) Foreign Application Priority Data

Jul. 19, 2002 (KR) .......................................... 2002-42566

(51) Int. Cl.[7] ................................................. H01R 3/00
(52) U.S. Cl. ...................... 439/165; 439/607; 439/76.1; 439/31; 16/303
(58) Field of Search ............................... 439/165, 76.1, 439/607, 31, 446; 16/303

(56) References Cited

U.S. PATENT DOCUMENTS

| 5,001,659 | A | | 3/1991 | Watabe |
| 5,173,837 | A | | 12/1992 | Blackwell et al. |
| 5,608,604 | A | | 3/1997 | Francis |
| 5,615,259 | A | | 3/1997 | Gilbert ........................ 379/433 |
| 6,083,010 | A | | 7/2000 | Daoud |
| 6,134,121 | A | * | 10/2000 | Braxton ....................... 361/818 |
| 6,266,019 | B1 | * | 7/2001 | Stewart et al. .............. 343/702 |
| 6,292,980 | B1 | | 9/2001 | Yi et al. |
| 6,350,155 | B1 | | 2/2002 | Müllinger-Bausch et al. |

FOREIGN PATENT DOCUMENTS

EP 0 765 063 3/1997

* cited by examiner

Primary Examiner—Tho D. Ta
(74) Attorney, Agent, or Firm—Roylance, Abrams, Berdo & Goodman, L.L.P.

(57) ABSTRACT

The present invention provides a portable wireless terminal which includes a main body and a folder which is rotatably connected to the main body, and a method for using the same. The portable wireless terminal further comprises a housing of the main body which is coated with an electrically conductive material on the inner surface in order to provide a ground for an electric circuit device mounted in the main body, a housing of the folder which is coated with an electrically conductive material on the inner surface in order to provide a ground for an electric circuit device mounted in the folder, and a hinge module which is received within the folder and rotatably connects the folder to the main body. The hinge module also electrically interconnecting the ground of the main body and the ground of the folder. The portable wireless terminal of this construction can significantly reduce electromagnetic wave absorption rate by interconnecting the grounds of the main body and the folder thereof through the hinge module. Furthermore, because the main body and the folder are interconnected without repeated testing procedures using a ground pattern or an electromagnetic wave absorbing material, the production cost can be significantly reduced.

8 Claims, 8 Drawing Sheets

PORTABLE WIRELESS TERMINAL WITH A GROUND CONNECTING DEVICE USING A HINGE MODULE AND METHOD FOR USING THE SAME

PRIORITY

This application claims priority to an application entitled "Portable Wireless Terminal with Ground Connecting Device Using Hinge Module" filed in the Korean Industrial Property Office on Jul. 19, 2002 and assigned serial No. 2002-42566, the contents of which are hereby incorporated by reference.

BACKGROUND OF THE INVENTION

1. Field of the Invention

The present invention relates to a portable wireless terminal and, more particularly, to a folder type terminal which can reduce an electromagnetic wave absorption rate by using a hinge module and a method for using the same.

2. Description of the Related Art

Typically, a portable wireless terminal is classified into a bar type, flip type and folder type in accordance with its appearance.

The bar type terminal is a type that comprises a single body housing mounted with data inputting and outputting devices and transmitting and receiving modules. In the terminal of this type, a malfunction may occur because the key pad which serves as data inputting and outputting device is always exposed and there are limitations in miniaturization due to the problem in securing a sufficient distance between the transmitting and the receiving modules.

The flip type terminal is a type that comprises a main body, a flip cover and a hinge module which interconnects the main body and the flip. The data inputting and outputting devices and transmitting and receiving modules mounted in the main body, and the flip cover covers the key pad which serves as the data inputting device, to thereby protect and prevent malfunction of the data inputting device. However, the flip type terminal also has limitations in miniaturization due to the problem in securing a sufficient distance between the transmitting and receiving modules.

The folder type terminal is the type that comprises a main body, a folder and a hinge module which rotatably interconnects the main body and the folder, such that the terminal is opened or closed by rotating the folder. In the state where the folder is in close contact with the main body, the terminal is in the communication standby mode and thus malfunction of the keypad can be prevented. In the communication mode, the folder is extended and thus it is possible to secure a sufficient distance between the transmitting module and the receiving module. This feature is also advantageous for miniaturization of the terminal.

FIG. 1 is a perspective view showing a conventional portable wireless terminal, in particular, a folder type terminal 100.

As shown in FIG. 1, the conventional folder type terminal 100 comprises a main body 110 and a folder 150 which are interconnected to be capable of being opened and closed by being rotated by a hinge module (not shown). The main body 100 includes a key pad 113 and a transmitting module 115 on its housing 111, and includes a side hinge arm 117 at each side of its upper end.

The folder 150 includes an exposed display device 153 on its housing 151 and a receiving module 155 at its upper end. The folder housing 151 includes a center hinge arm 157 at its lower end, which is interposed between the side hinge arms 117 of the main body housing 111 and rotatably connects the folder 150 to the main body 10. The center hinge arm 157 includes a certain hinge module.

An example of a hinge module is disclosed in U.S. Pat. No. 6,292,980 granted on Sep. 25, 2001 in the name of the present applicant. The disclosed hinge module comprises a hinge cam and a hinge shaft which are formed with a peak-shaped part and a valley-shaped part, respectively, and a spring which renders the hinge cam and the hinge shaft to come into close contact with each other. The hinge cam, the hinge shaft and the spring are received within a hinge housing, and the folder or flip is opened or closed by using the cooperation between curved surfaces of the peak and valley-shaped parts and the elastic force exerted by the spring.

Meanwhile, research results which show that electromagnetic waves are harmful to human body are being successively reported, and thus many countries in the world are tending to strengthen the regulation for emission of electromagnetic waves from a portable wireless terminal.

However, the methods for reducing the emission of electromagnetic waves from a portable wireless terminal are limited to attaching an electromagnetic wave absorbing material on the antenna or the electric power supply part of the antenna, or moving the electromagnetic wave concentration position or canceling electromagnetic waves by changing a ground pattern formed on the inner side of an injection molded component of the terminal. Moreover, although those methods are effective in reducing electromagnetic wave absorption rate, they tend to deteriorate radiation characteristics of the antenna. Those methods also have a problem in that the position of the electromagnetic wave absorbing material or the ground pattern should be adjusted through repeated tests and inspections in order to satisfy both the electromagnetic wave absorption rate of human body and the radiation characteristics of the antenna.

SUMMARY OF THE INVENTION

Accordingly, the embodiments of present invention described herein endeavor to substantially solve the above-mentioned problems occurring in the known devices. Hence, an object of the present invention is to provide a portable wireless terminal which reduces electromagnetic wave absorption rate.

Another object is to provide a portable wireless terminal which can satisfactorily maintain the radiation characteristics of the antenna while reducing the electromagnetic wave absorption rate.

In order to accomplish these and other objects, an embodiment of the present invention provides a portable wireless terminal which includes a main body and a folder which is rotatably connected to the main body. The terminal further comprises a housing of the main body which is coated with an electrically conductive material on the inner surface in order to provide a ground for an electric circuit device mounted in the main body, a housing of the folder which is coated with an electrically conductive material on the inner surface in order to provide a ground for an electric circuit device mounted in the folder, and a hinge module which is received within the folder and rotatably connects the folder to the main body, with the hinge module electrically interconnecting the ground of the main body and the ground of the folder.

An embodiment of the present invention also provides a portable wireless terminal which includes a main body and a folder which is rotatably connected to the main body. The terminal further comprises a main body housing which is provided with a side hinge arm at each side of the upper end, a folder housing which is provided with a center hinge arm at the center of the lower end, with the center hinge arm corresponding to the side hinge arms of the main body, a hinge module which is received within the center hinge arm and rotatably connects the folder to the main body, and a hinge dummy which is fixedly engaged with the side hinge arms of the main body. The hinge dummy is connected to the hinge module, which comprises a hinge housing which has an open end provided with a shaft hole and a closed end, with one side of the hinge housing being opened to form a receiving space and a side wall of the hinge housing being formed with a guide groove of a predetermined length. The hinge module also comprises a hinge shaft which is rotatably received within the hinge housing and which is provided with a peak-shaped part at one end and a hinge stem at the other end, with the hinge stem being projected through the shaft hole formed in the hinge housing and connected to the main body; and a hinge cam which has a valley-shaped part corresponding to the peak-shaped part of the hinge shaft, one side of the hinge cam being provided with a guide projection which performs rectilinear movements within the guide grove formed in the hinge housing. The hinge module further includes an elastic portion which is abutted against the internal wall in the open end side of the hinge housing and presses the valley-shaped part of the hinge cam and the peak-shaped part of the hinge shaft toward each other to come into close contact with each other, and a hinge stopper which is fixedly engaged with the inner wall of the open end side of the hinge housing, with the hinge stopper being provided with a through hole, through which the hinge stem of the hinge shaft is extended, and a stopper which extends from a side of the hinge stopper and longitudinally projected from a side of the open end of the hinge housing. The hinge dummy comprises an engaging hole, into which the hinge stem is fixedly fitted, and b) a guide groove which is formed on the circumferential surface of the hinge dummy and provides a passageway to which the stopper of the hinge stopper is movably connected.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, certain exemplary embodiments of the present invention will be described with reference to the accompanying drawings. In the following description of the present invention, a detailed description of known functions and configurations incorporated herein will be omitted when it may make the subject matter of the present invention rather unclear.

Figure 1:
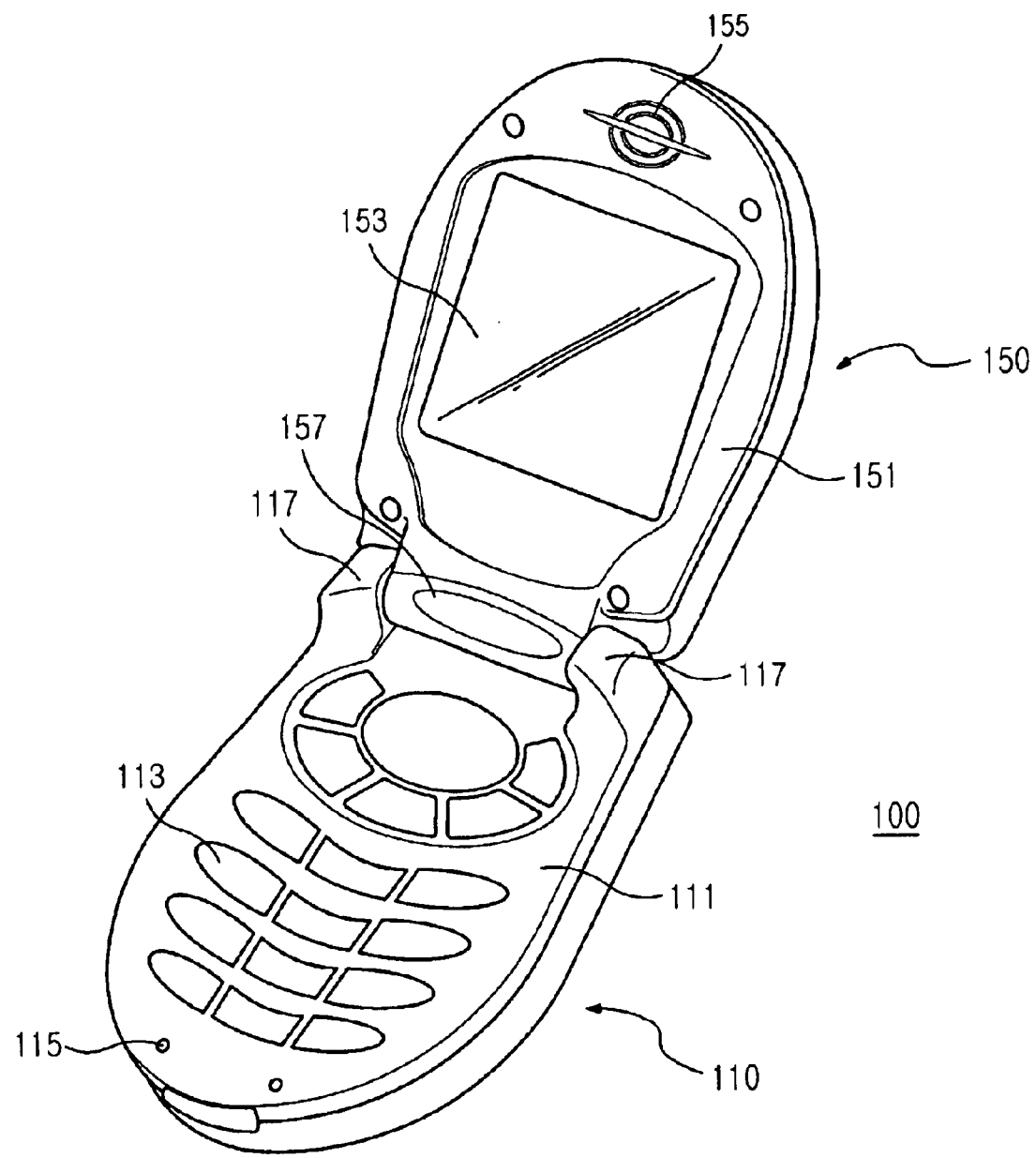
FIG. 1 is a perspective view showing a conventional portable wireless terminal.
Figure 2:
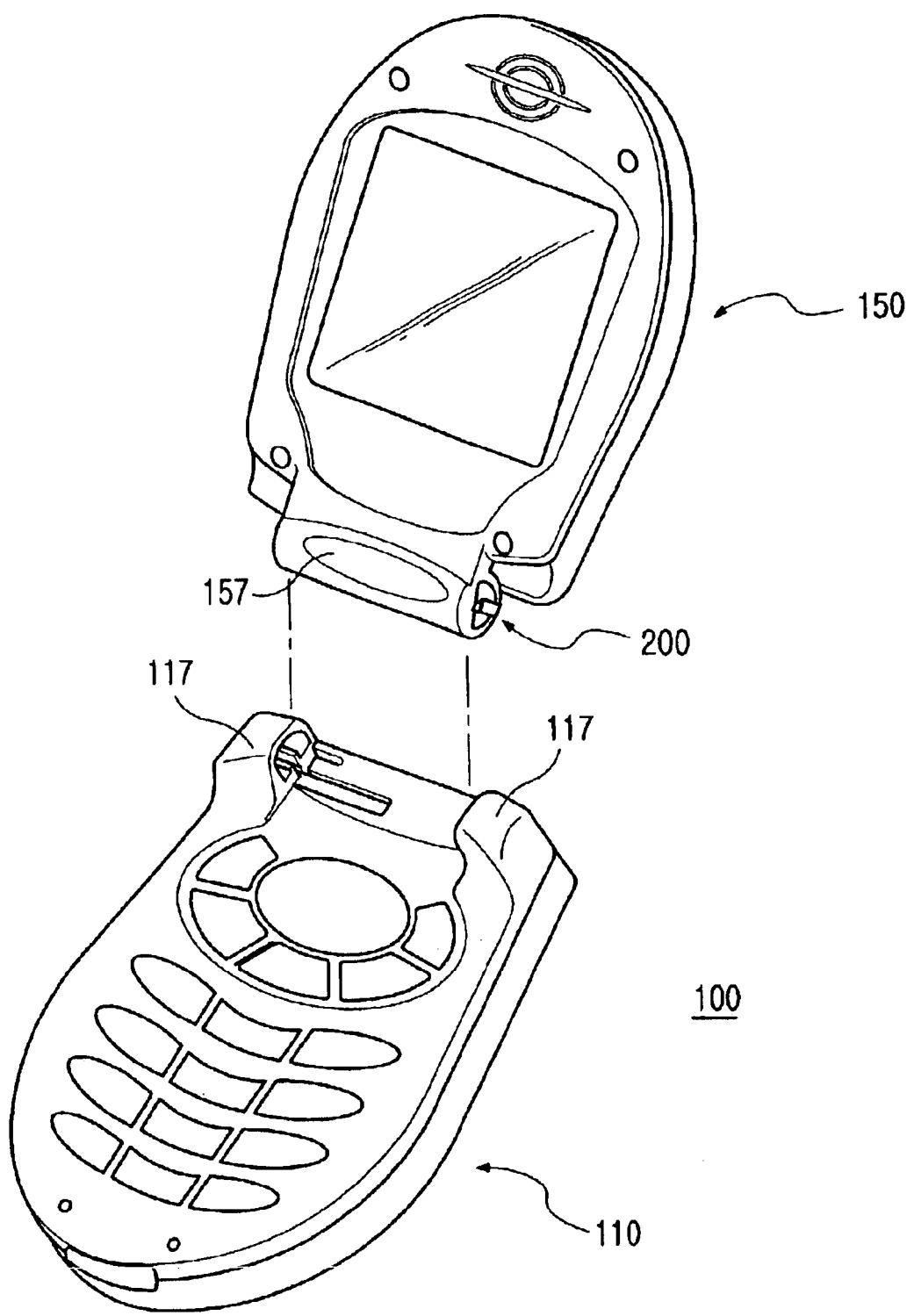
FIG. 2 is an exploded perspective view showing the disassembled aspect of a main body and a folder of a portable wireless terminal in accordance with an embodiment of the present invention.
Figure 3:
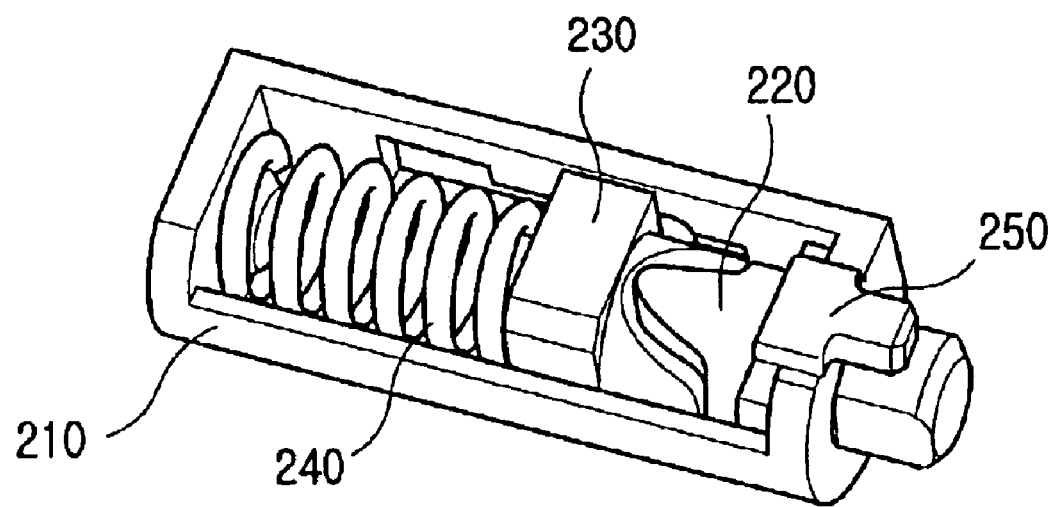
FIG. 3 is a perspective view of the hinge module of the portable wireless terminal shown in FIG. 2.

FIG. 2 is an exploded view showing the disassembled aspect of an main body 110 and a folder 150 of a portable wireless terminal in accordance with an embodiment of the present invention, and FIG. 3 is a perspective view of a hinge module of the portable wireless terminal shown in FIG. 2.

As shown in FIGS. 2 and 3, the portable wireless terminal according to an embodiment of the present invention comprises grounds which are individually provided on the main body 100 and the folder 150, such that the grounds are adapted to be electrically interconnected each other using a hinge module 200 for interconnecting the main body 100 and the folder 150.

The hinge module 200 is constructed to be contained within a center hinge arm 157 of the folder 150 and to be connected to side hinges 117 of the main body 110. The hinge module 200 will now be described in more detail with reference to FIGS. 3 and 4.

Figure 4:
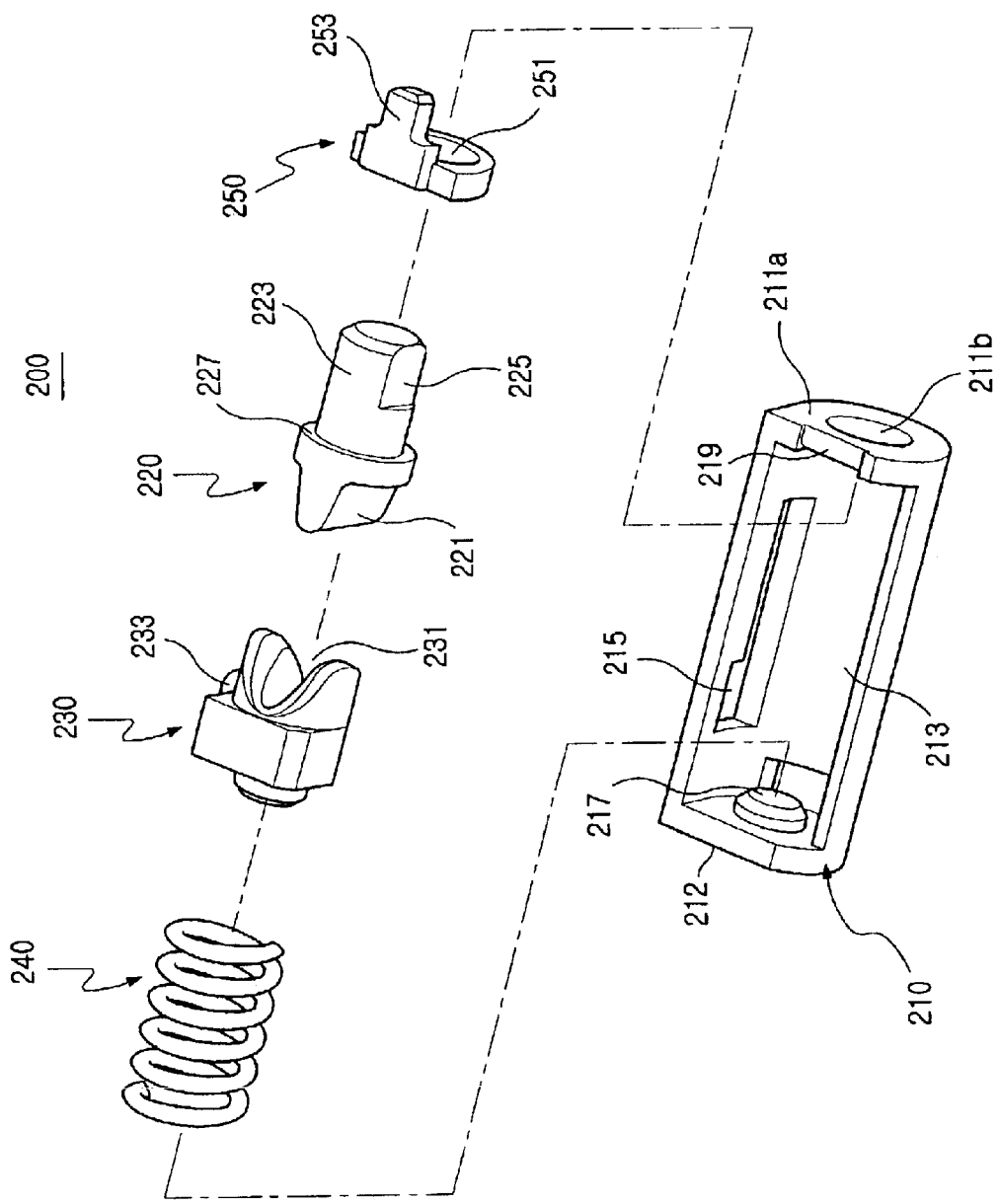
FIG. 4 is an exploded view of the hinge module shown in FIG. 3.

FIG. 3 is a perspective view showing the hinge module 200 shown in FIG. 2, and FIG. 4 is an exploded view of the hinge module 200 shown in FIG. 3.

As shown in FIGS. 3 and 4., the hinge module 200 comprises a hinge housing 210, which contains a hinge shaft 220, a hinge cam 230, an elastic component 240 and a hinge stopper 250. The hinge housing 210 is provided with a closed end 212 at one longitudinal end and an open end 211a at the other end, the open end being formed with a shaft hole 211b. The hinge housing 210 further comprises a receiving space 213, of which one side wall is opened. The hinge housing 210 also has a guide groove 215 which is formed on the internal wall.

The hinge shaft 220 comprise a peak-shaped part 221 which is diametrically extended at one end and a hinge stem 223 at the other end, such that the hinge stem 223 projects outwardly through the open end 211a of the hinge housing 210. An end of the hinge stem 223 is formed with a raised surface 227, which is abutted against the hinge stopper 250. The hinge shaft 220 is fixedly connected to the main body 110 of the portable wireless terminal while being rotatable within the hinge housing 210. That is, the hinge stem 223 is projected out of the hinge housing 210 and connected to the main body 110. The other end of the hinge stem 223 is provided with a flat surface, so that the hinge stem 223 is fixed to the main body 110.

The hinge cam 230 is formed with a valley-shaped part 231 at one end, which corresponds to the peak-shaped part 221 of the hinge shaft 220, with the peak-shaped part 221 and the valley-shaped part 231 being adapted to be in sliding contact. A guide projection 233 is formed on the circumferential surface of the hinge cam 230 and engaged with the guide groove 215. Therefore, the hinge cam 230 is allowed to perform rectilinear reciprocation within the hinge housing 210.

It is preferred to use a coil spring for the elastic components 240. One end of the elastic component 240 is fit over projection 217, and is abutted against the inner wall of the closed end 212 of the hinge housing 210 and presses the hinge cam 230 in the longitudinal direction of the hinge shaft 220. As a result, the elastic force exerted by the elastic component 240 causes the peak-shaped part 221 of the hinge shaft 220 and the valley-shaped part 231 of the hinge cam 230 to be in close contact.

The hinge stopper 250 is fixedly connected to the internal wall of the open end 211a of the hinge housing 210. The hinge stopper 250 has a through-hole 251 for allowing the hinge stem 223 to be pass there through Also, a stopper 253 is provided on a side of the hinge stopper 250, and projects out of the open end 211a of the hinge housing 210. In order to firmly connect the hinge stopper 250, a seating recess 219 is formed on the circumferential surface of the open end 211a of the hinge housing 210 and the stopper 253 comes into close contact with the seating recess 219. The stopper 253 is connected to the main body of the portable wireless terminal. The hinge stem 223 of the hinge shaft 220 is fixedly engaged with the main body, while the stopper 253 is adapted to perform repeated swivel movement around the hinge stem 223.

Although not shown in the drawings, the main body and the folder of the terminal each includes an electric circuit device. For example, the main body is mounted with a main board which manages the telecommunication function and the like of the terminal, and the folder is mounted with an electric circuit device which is connected to a display device, a receiving unit and the like. Electromagnetic waves generated from such electric circuit devices during the period of transmitting and receiving operation may not only cause the malfunction of the electric circuits, but may also exert a harmful influence on a human body.

In order to suppress the generation of such electromagnetic waves, the main body and the folder of the terminal are provided with grounds for the electric circuits by depositing a conductive material such as gold or silver on internal surfaces thereof. In addition, in order to reduce the electromagnetic wave absorption rate by human body, the grounds which are individually formed in the main body and the folder are adapted to be electrically interconnected through the hinge module.

Figure 5:
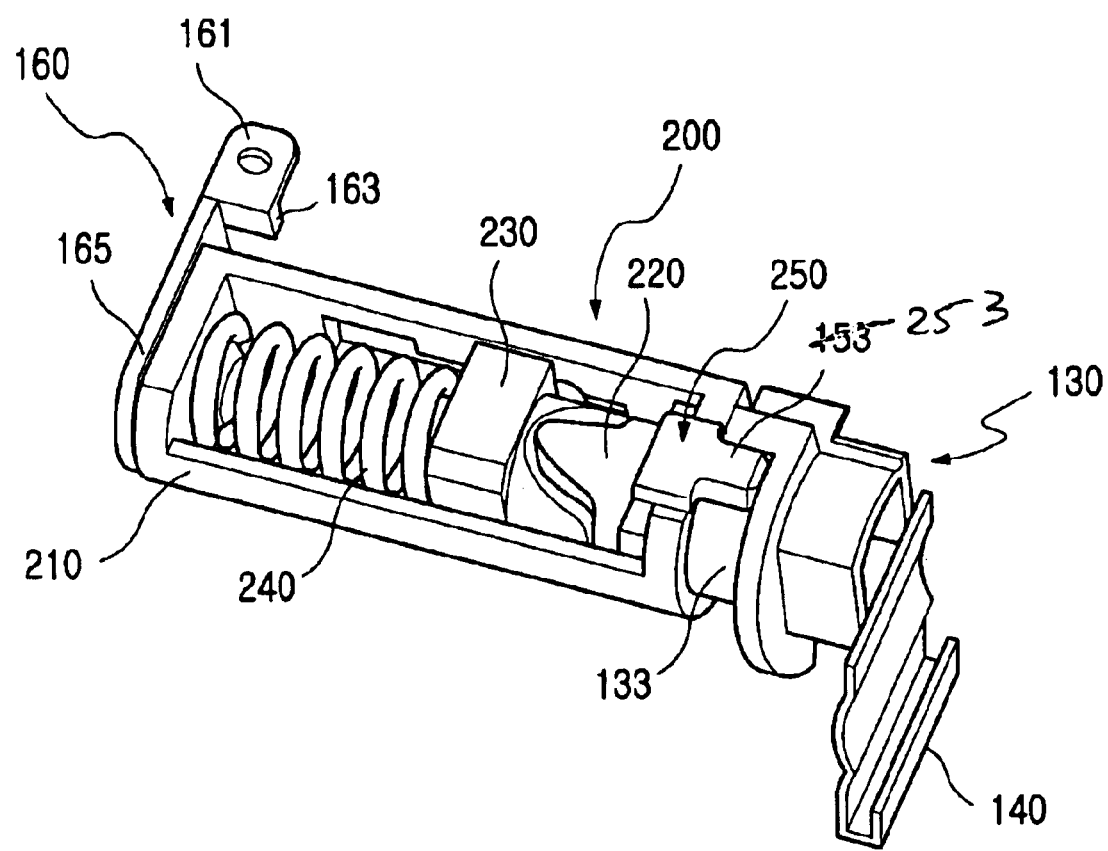
FIG. 5 is a perspective for illustrating a construction for applying the hinge module shown in FIG. 3 to a portable wireless terminal

FIG. 5 is a perspective view for illustrating a construction for applying the hinge module shown in FIG. 3 to a portable wireless terminal. As shown in FIG. 5, a first contact piece 160 is in contact with a side of the closed end 212 of the hinge housing 210, a hinge dummy 130 is connected to the hinge stem 223 of the hinge shaft 220 and the stopper 253 of the hinge stopper 250, and a second contact piece 140 is in contact with the hinge dummy 130.

Because the above construction is made for electrical interconnection, it is apparent that the first and second contact pieces 160, 140, the hinge housing 210, the hinge stopper 250 and the hinge dummy 130 should be formed from an electrically conductive material. Alternatively, it is possible to make the hinge shaft 220 from an electrically conductive material without using the hinge stopper 250. However, considering the sliding contact between the peak-shaped part 221 and the valley-shaped part 231, it is preferable to make the hinge shaft 220 from a synthetic resin.

An example of a manner to install the above components within a portable wireless terminal with now be described with reference to FIGS. 6 to 8.

Figure 6:
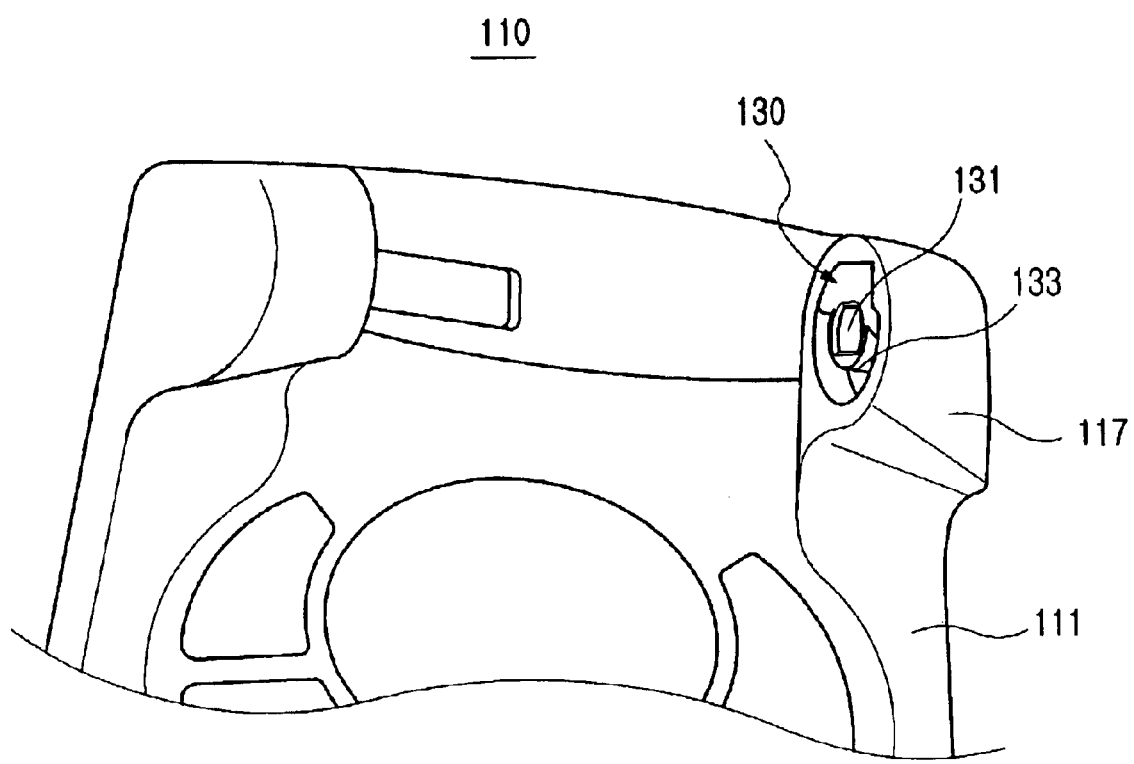
FIG. 6 is a perspective view showing the main body of the portable wireless terminal, within which the hinge dummy shown in FIG. 5 is installed.

FIG. 6 is a perspective view showing the main body 110 of the portable wireless terminal, within which the hinge dummy 130 shown in FIG. 5 is installed. FIG. 7 is a perspective view showing the interior of the main body 110 of the portable wireless terminal shown in FIG. 5, and FIG. 8 is a perspective view showing partially in section the inner side of the folder 150 of the portable wireless terminal shown in FIG. 5, within which the hinge module 200 and the first contact piece 160 shown in FIG. 5 are installed.

Figure 7:
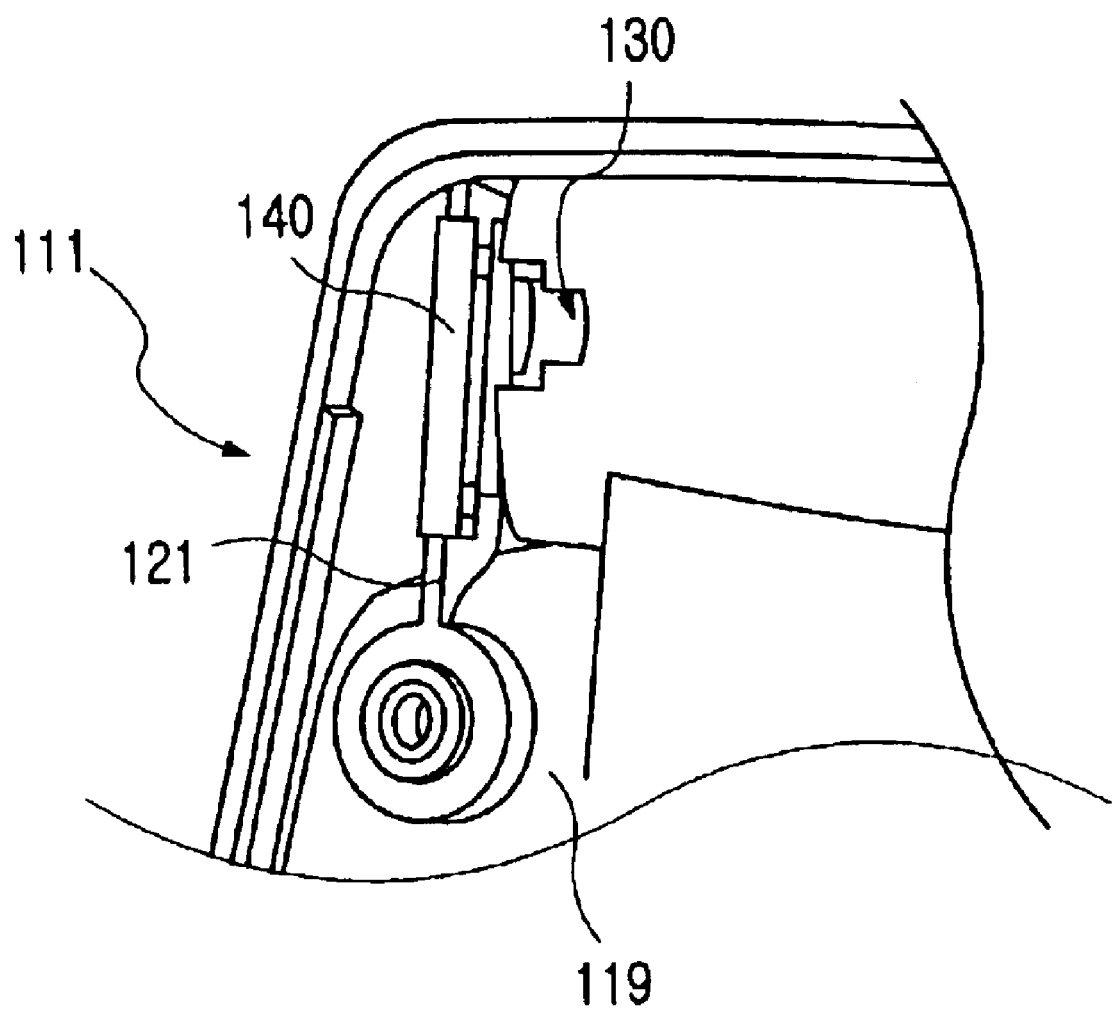
FIG. 7 is a perspective view showing the inner side of the main body of the portable wireless terminal shown in FIG. 5.

FIGS. 6 and 7 illustrate an example of how to install the hinge dummy 130 and the second contact piece 140 in the main body 110, with the hinge dummy 130 being installed within the side hinge arm 117 of the main body 110. The hinge dummy 130 is provided with a connecting hole, into which the hinge stem 223 is fitted, and a guide groove 133 along which the stopper 253 performs swivel reciprocating. Therefore, the connecting hole 131 and the guide groove 133 are exposed outwardly on the side hinge arm 117 of the main body housing 130. The hinge dummy 130 is extended into the main body housing 111. An electrically conductive material is coated on the internal surface of the main body housing 111 and forms a ground, and the second contact piece 140 is fixed within the inner side of the main body housing 111 to be connected with the ground as well as contacted with the hinge dummy 130. In order to fix the second contact piece 140, a rib 121 may be formed in the main body housing 111.

Figure 8:
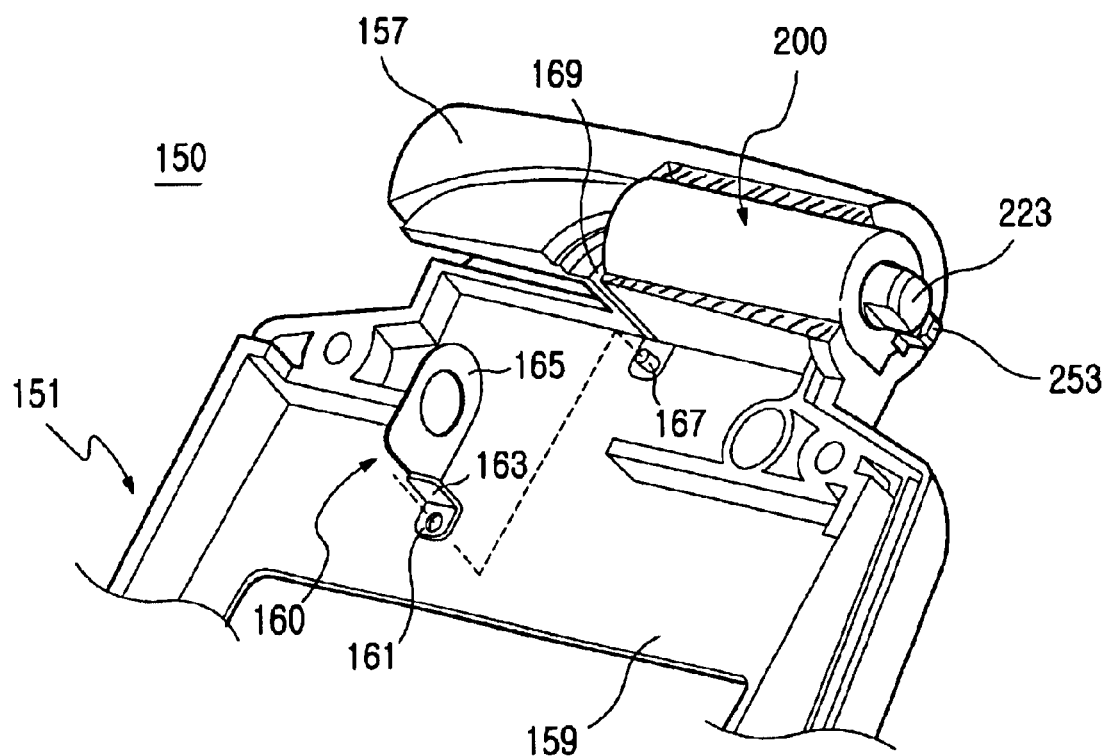
FIG. 8 is a perspective view showing partially in section the inner side of the folder of the portable wireless terminal shown in FIG. 5, within which the hinge module and the contact piece shown in FIG. 5 are installed.

FIG. 8 illustrates and example of how to install the first contact surface 160 and the hinge module, with the hinge module 200 being contained in the center hinge arm 157 of the folder housing 151 and the first contact piece 160 is fixed within the folder 150.

The hinge module 200 renders the hinge stem 223 and the stopper 253 to be projected to the side of the hinge dummy 130 which is installed in the main body, while being received within the center hinge arm 157. Therefore, the hinge stem 223 is fitted into the connecting hole 131 of the hinge dummy 130 and the stopper 253 is fitted into the guide groove 133 of the hinge dummy 130. The stopper 253 performs swivel reciprocating while being in contact with the side walls of the guide groove 133.

The first contact piece 160 comprises a connecting part 161 which is fixed on the inner surface of the folder housing 151, a supporting part 163 which is bent and extended from the connecting part 161 and abutted on a side wall of the folder housing 151, and a contact part 165 which is bent from the supporting part 163 and extended to the inner side of the center hinge arm 157. Meanwhile, the center hinge arm 157 is provided with a slit 169 which allows the contact part 165 to be extended into the center hinge arm 157. The contact part 165 extended into the center hinge arm 157 comes in contact with the hinge housing 210 of the hinge module 200. The internal surface 159 of the folder housing 151 may be provided with a connecting projection 167 for fixing the first contact piece 160.

As described above, the internal surface 159 of the folder housing 151 is provided with a ground formed by coating an electrically conductive material. The first contact piece 160 is connected to the ground as well as comes into contact with the hinge housing 210, by being fixed on the internal surface of the folder housing 151.

As a result, the grounds each provided in the main body 110 and the folder 150 are interconnected through the first contact piece 160, the hinge housing 210, the hinge stopper 250, the hinge dummy 130 and the second contact piece 140.

Receiving sensitivity, radiation power and specific absorption rate (SAR) are measured using portable wireless terminals in which the grounds of the main body and the folder are interconnected as described above. Examples of the measuring conditions and results are given in Table 1 below.

TABLE 1

| Measuring Condition | Measuring Direction | Receiving Sensitivity | | Radiation Power | | Remarks |
| --- | --- | --- | --- | --- | --- | --- |
| | | Before applying the invention | After applying the invention | Before applying the invention | After applying The invention | |
| Folder closed Antenna in | Rear of terminal (battery side) | −90 dBm | −90 dBm | 16.1 dBm | 15.7 dBm | Usual receiving condition |
| Folder open Antenna in | Front of terminal measuring (SAR surface) | — | — | 13.7 dBm | 1.3 dBm | SAR measuring condition |
| Folder open Antenna out | Rear of terminal (Battery side) | −87 dBm | −88 dBm | 14.0 dBm | 13.3 dBm | Usual transmitting condition |

The Table 1 shows the measuring results of receiving sensitivity and radiation power in comparison before and after interconnecting the grounds of the main body and the folder as disclosed by the present invention. It can be seen that under the condition where the specific electromagnetic wave absorption rate by human body is relatively high. That is, in the state where the folder is opened and the antenna is positioned within the terminal, the electromagnetic wave absorption rate is significantly reduced in the terminal to which an embodiments of the present invention is applied. Also, it can be seen that radiation power and receiving sensitivity are not reduced under the usual transmitting and receiving condition.

An example of the electromagnetic wave absorption rate measured in the states where the folder is opened and the antenna is positioned within the portable wireless terminal in Table 2 as follows.

TABLE 2

| Measured band and channel | | Before applying the invention (mW/g) | After applying the invention (mW/g) |
| --- | --- | --- | --- |
| CDMA (25.5 dBm) | 1011 | 1.50 | 0.35 |
| | 363 | 1.52 | 0.41 |
| | 779 | 1.37 | 0.41 |
| AMPS (27.5 dBm) | 991 | 2.41 | 0.62 |
| | 384 | 1.81 | 0.63 |
| | 799 | 2.44 | 0.54 |

As shown in Table 2, it will be appreciated that the electromagnetic wave absorption rates after applying the present invention. That is, after the grounds of the main body and the folder being interconnected are significantly reduced as compared that before applying an embodiment of the present invention, the before the grounds of the main body and the folder became interconnected. Herein, mW/g is a unit for indicating the intensity of electromagnetic waves (mW) applied to human body per 1 g of weight, and the Federal Communication Committee of USA prescribes that the permissible electromagnetic wave absorption rate shall not exceed 1.60 mW/g. Considering this prescription, the terminals of CDMA mode exhibit the electromagnetic wave absorption rates near the permissible limit and the terminals of AMPS mode exhibit the electromagnetic wave absorption rates over the permissible limit.

In addition, the electromagnetic wave absorption rates of the terminals to which an embodiment of the present invention is applied are reduced to a level below 30% of the values measured before the present invention is applied, and thus sufficiently meets with the prescription of the FCC.

As described in the above, a portable wireless terminal made in accordance with the present invention can significantly reduce the electromagnetic wave absorption rates by interconnecting the grounds of the main body and the folder thereof through an hinge module. Furthermore, the present invention interconnects the main body and the folder without repeated testing procedures using a ground pattern or an electromagnetic wave absorbing material as in the known devices, and thus contributes to the reduction of production costs.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable wireless terminal which includes a main body and a folder which is rotatably connected to the main body, the terminal further comprising:

a housing of the main body which is coated with an electrically conductive material on the inner surface in order to provide a ground for an electric circuit device mounted in the main body, a housing of the folder which is coated with an electrically conductive material on the inner surface in order to provide a ground for an electric circuit device mounted in the folder; and a hinge module which is received within the folder and rotatably connects the folder to the main body, the hinge module also being adapted to electrically interconnect the ground of the main body and the ground of the folder.

2. The portable wireless terminal according to claim 1 further comprising:

a pair of side hinge arms, each formed at opposite sides of upper end of the main body housing;

a center hinge arm which is provided at the lower end of the folder housing to correspond the side hinge arms of the main body housing, such that the hinge arm is formed with a slit and the hinge module is adapted to be received within the center hinge arm;

a first contact piece of an electrically conductive material, which is fixed on the inner surface of the folder housing and connected to the ground of the folder housing, such that the first contact piece is adapted to extend through the slit formed in the center hinge arm and come into contact with the hinge module;

a hinge dummy of an electrically conductive material, which is fixedly mounted in the side hinge arms of the main body housing and connected to the hinge module; and a second contact piece of an electrically conductive material, which is fixed on the inner surface of the main body housing and connected to the ground of the main body housing while coming into contact with the hinge dummy.

3. The portable wireless terminal according to claim 1, wherein the hinge module comprises:

a hinge housing which has an open end provided with a shaft hole and a closed end, one side of the hinge housing being opened to form a receiving space and a side wall of the hinge housing being formed with a guide groove of a predetermined length;

a hinge shaft which is rotatably received within the hinge housing and is provided with a peak-shaped part at one end and a hinge stem at the other end, the hinge stem being adapted to project through the shaft hole formed in the hinge housing and connected to the main body;

a hinge cam which has a valley-shaped part corresponding to the peak-shaped part of the hinge shaft, one side of the hinge cam being provided with a guide projection which is adapted to perform rectilinear movements within the guide grove formed in the hinge housing;

an elastic component which is abutted against the internal wall in the open end side of the hinge housing and compresses the valley-shaped part of the hinge cam and the peak-shaped part of the hinge shaft into close contact with each other; and a hinge stopper which is fixedly engaged with the inner wall of the open end side of the hinge housing, the hinge stopper being provided with a through hole, through which the hinge stem of the hinge shaft is adapted to extend, and a stopper which extends from a side of the hinge stopper and longitudinally projects from a side of the open end of the hinge housing.

4. The portable wireless terminal according to claim 3, wherein the hinge stem is fixedly connected to the main body and the stopper of the hinge stopper is connected to the main body to be capable of being rotated about the hinge stem.

5. The portable wireless terminal according to claim 3, wherein the hinge housing and the hinge stopper are formed from an electrically conductive material.

6. A portable wireless terminal which includes a main body and a folder which is rotatably connected to the main body, the terminal further comprising:

a main body housing which is provided with a side hinge arm at each side of the upper end;

a folder housing which is provided with a center hinge arm at the center of the lower end, the center hinge arm corresponding to the side hinge arms of the main body;

a hinge module which is received within the center hinge arm and which rotatably connects the folder to the main body; and a hinge dummy which is fixedly engaged with the side hinge arms of the main body, the hinge dummy being connected to the hinge module, wherein the hinge module comprises:

a) a hinge housing which has an open end provided with a shaft hole and a closed end, one side of the hinge housing being opened to form a receiving space and a side wall of the hinge housing being formed with a guide groove of a predetermined length;

b) a hinge shaft which is rotatably received within the hinge housing and is provided with a peak-shaped part at one end and a hinge stem at the other end, the hinge stem being adapted to project through the shaft hole formed in the hinge housing and connect to the main body;

c) a hinge cam which has a valley-shaped part corresponding to the peak-shaped part of the hinge shaft, one side of the hinge cam being provided with a guide projection which is adapted to perform rectilinear movements within the guide grove formed in the hinge housing;

d) an elastic component which is abutted against the internal wall in the open end side of the hinge housing and presses the valley-shaped part of the hinge cam and the peak-shaped part of the hinge shaft towards each other to come into close contact with each other; and e) a hinge stopper which is fixedly engaged with the inner wall of the open end side of the hinge housing, the hinge stopper being provided with a through hole, through which the hinge stem of the hinge shaft is extended, and a stopper which extends from a side of the hinge stopper and longitudinally projected from a side of the open end of the hinge housing, and wherein the hinge dummy comprises:

a) an engaging hole, into which the hinge stem is fixedly fitted; and b) a guide groove which is formed on the circumferential surface of the hinge dummy and provides a passageway to which the stopper of the hinge stopper is movably connected.

7. The portable wireless terminal according to claim 6, wherein the inner surfaces of the main body housing and the folder housing are individually coated with an electrically conductive material, and the hinge housing, the hinge stopper and the hinge dummy are formed from an electrically conductive material, and wherein the terminal further comprises: a first contact piece of an electrically conductive material, which is fixed on the inner side of the folder to be connected to the ground of the folder, the first contact piece being extended into the inner side of the side hinge arms and coming into contact with the hinge housing; and a second contact piece of an electrically conductive material, which is fixed on a rib formed on the inner side of the side hinge arms to be connected to the ground of the main body and to come into contact with the hinge dummy, such that the ground of the main body and the ground of the folder are interconnected.

8. The portable wireless terminal according to claim 6, wherein the stopper of the hinge stopper reciprocates in the state that it is in contact with the side wall of the guide groove formed in the hinge dummy.

* * * * *